United States Patent
Liang

(10) Patent No.: US 11,908,482 B2
(45) Date of Patent: Feb. 20, 2024

(54) PACKET LOSS RETRANSMISSION METHOD, SYSTEM, AND APPARATUS, COMPUTER-READABLE STORAGE MEDIUM, AND DEVICE

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/730,061

(22) Filed: Apr. 26, 2022

(65) Prior Publication Data

US 2022/0254354 A1 Aug. 11, 2022

Related U.S. Application Data

(63) Continuation of application No. PCT/CN2021/095677, filed on May 25, 2021.

(30) Foreign Application Priority Data

Jun. 28, 2020 (CN) .......................... 202010601648.X

(51) Int. Cl.
*G10L 19/005* (2013.01)
*G10L 19/02* (2013.01)
(Continued)

(52) U.S. Cl.
CPC ............ *G10L 19/005* (2013.01); *G10L 19/02* (2013.01); *G10L 25/18* (2013.01); *G10L 25/21* (2013.01)

(58) Field of Classification Search
CPC ................................ G10L 25/18; G10L 25/21
See application file for complete search history.

(56) References Cited

U.S. PATENT DOCUMENTS

| 6,343,269 B1 * | 1/2002 | Harada | ................... G10L 15/24 |
| | | | 704/E15.041 |
| 2003/0187634 A1 * | 10/2003 | Li | ........................... G10L 19/02 |
| | | | 704/E19.01 |

(Continued)

FOREIGN PATENT DOCUMENTS

| CN | 102137438 A | 7/2011 |
| CN | 104105045 A | 10/2014 |

(Continued)

OTHER PUBLICATIONS

Tencent Technology, ISR, PCT/CN2021/095677, Aug. 12, 2021, 2 pgs.

(Continued)

*Primary Examiner* — Douglas Godbold
(74) *Attorney, Agent, or Firm* — Morgan, Lewis & Bockius LLP

(57) ABSTRACT

This application provides a packet loss retransmission method, a computer-readable storage medium, and an electronic device. The packet loss retransmission method includes: obtaining a loudness corresponding to a target audio data packet; and in response to receiving a packet loss state indicating that the target audio data packet is lost, in accordance with a determination that the loudness corresponding to the target audio data packet meets a first threshold: retransmitting the target audio data packet. The technical solutions of this application may alleviate the problem of long data retransmission time, and improve data transmission efficiency.

20 Claims, 8 Drawing Sheets

(51) Int. Cl.
*G10L 25/18* (2013.01)
*G10L 25/21* (2013.01)

(56) References Cited

U.S. PATENT DOCUMENTS

| | | | |
|---|---|---|---|
| 2005/0137857 A1* | 6/2005 | Greer | G10L 19/16 |
| | | | 704/201 |
| 2008/0219471 A1* | 9/2008 | Sugiyama | G10L 21/0208 |
| | | | 381/94.2 |
| 2010/0010808 A1* | 1/2010 | Sugiyama | G10L 21/0208 |
| | | | 704/203 |
| 2018/0005642 A1* | 1/2018 | Wang | G10L 21/0208 |
| 2018/0278372 A1* | 9/2018 | Liang | H04L 1/1887 |
| 2020/0075037 A1* | 3/2020 | Ito | G06F 17/10 |
| 2020/0273481 A1* | 8/2020 | Deruty | G10L 21/0316 |

FOREIGN PATENT DOCUMENTS

| | | |
|---|---|---|
| CN | 106067847 A | 11/2016 |
| CN | 106899380 A | 6/2017 |
| CN | 111246312 A | 6/2020 |

OTHER PUBLICATIONS

Tencent Technology, WO, PCT/CN2021/095677, Aug. 12, 2021, 5 pgs.
Tencent Technology, IPRP, PCT/CN2021/095677, Dec. 13, 2022, 6 pgs.

* cited by examiner

PACKET LOSS RETRANSMISSION METHOD, SYSTEM, AND APPARATUS, COMPUTER-READABLE STORAGE MEDIUM, AND DEVICE

CROSS-REFERENCE TO RELATED APPLICATIONS

This application is a continuation application of PCT Patent Application No. PCT/CN2021/095677, entitled "LOST PACKET RETRANSMISSION METHOD, SYSTEM, AND APPARATUS, COMPUTER READABLE STORAGE MEDIUM, AND DEVICE" filed on May 25, 2021, which claims priority to Chinese Patent Application No. 202010601648.X, filed with the State Intellectual Property Office of the People's Republic of China on Jun. 28, 2020, and entitled "PACKET LOSS RETRANSMISSION METHOD, SYSTEM, AND APPARATUS, COMPUTER-READABLE STORAGE MEDIUM, AND DEVICE", all of which are incorporated herein by reference in their entirety.

FIELD OF THE TECHNOLOGY

This application relates to the field of computer technologies, and specifically, to a packet loss retransmission technology.

BACKGROUND OF THE DISCLOSURE

During audio data transmission, packet loss during data transmission usually occurs due to the stability of transmission networks and the like. For packet loss, data retransmission is generally used for ensuring that a receiver terminal receives complete data. The existing packet loss retransmission method is usually as follows: When a packet loss fed back by the receiver terminal is detected, a lost data packet included in the packet loss is retransmitted.

However, during real-time audio data transmission, there is usually the following case: Audio data (for example, a slight ambient sound) in an audio data packet is not necessarily perceptible to human ears after being decoded and outputted. If the packet loss of such data is also fed back according to the above-mentioned packet loss retransmission method, easily resulting in a long data retransmission time, which easily results in low data transmission efficiency.

SUMMARY

Objectives of this application are to provide a packet loss retransmission method, system, and apparatus, a non-transitory computer-readable storage medium, and an electronic device, which can alleviate the problem of long data retransmission time and improve the data transmission efficiency.

Other features and advantages of this application become obvious through the following detailed descriptions, or may be partially learned partially through the practice of this application.

According to an aspect of this application, a packet loss retransmission method is provided, including:
  obtaining a loudness corresponding to a target audio data packet; and
  in response to receiving a packet loss state indicating that the target audio data packet is lost: in accordance with a determination that the loudness corresponding to the target audio data packet meets a first threshold: retransmitting the target audio data packet.

According to an aspect of this application, a packet loss retransmission system is provided, including a transmitter terminal, a server, and a receiver terminal,
  the transmitter terminal being configured to transmit a target audio data packet to the server;
  the server being configured to obtain a loudness corresponding to the target audio data packet;
  the receiver terminal being configured to receive the target audio data packet, and transmit a packet loss state for representing that the target audio data packet is lost to the server; and
  the server being further configured to retransmit the target audio data packet to the receiver terminal according to the loudness corresponding to the target audio data packet in response to receiving the packet loss state.

According to an aspect of this application, a packet loss retransmission apparatus is provided, including:
  a loudness obtaining unit, configured to obtain a loudness corresponding to a target audio data packet; and
  a data transmission unit, configured to retransmit the target audio data packet according to the loudness corresponding to the target audio data packet when a packet loss state for representing that the target audio data packet is lost is received.

According to an aspect of this application, an electronic device for packet loss retransmission is provided, including: a processor; and a memory, configured to store executable instructions of the processor, the processor being configured to perform the method according to the foregoing aspect by executing the executable instructions.

According to an aspect of this application, a non-transitory computer-readable storage medium storing a computer program is provided, the computer program, when executed by a processor, implementing the method according to the foregoing aspect.

Exemplary embodiments of this application may have some or all of the following beneficial effects:

In the packet loss retransmission method provided in an exemplary embodiment of this application, the loudness corresponding to the target audio data packet may be obtained; and the target audio data packet may be retransmitted according to the loudness corresponding to the target audio data packet when the packet loss state for representing that the target audio data packet is lost is received. According to the foregoing description of the solutions, according to an aspect of this application, the loudness corresponding to the audio data packet may be used as the data retransmission condition, and the target audio data packet may be retransmitted in a targeted manner. Compared with the related art, retransmitting all the data packets including the target audio data packet and transmitted in the current time can reduce the amount of retransmitted data and reduce the occupation of network resources, thereby alleviating the problem of long data retransmission time and improving the data transmission efficiency.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Obviously, the accompanying drawings in the following descriptions are merely some embodiments of this application, and a person of ordinary skill in the art may further obtain other accompanying drawings according to the accompanying drawings without creative efforts.

DESCRIPTION OF EMBODIMENTS

Figure 1:
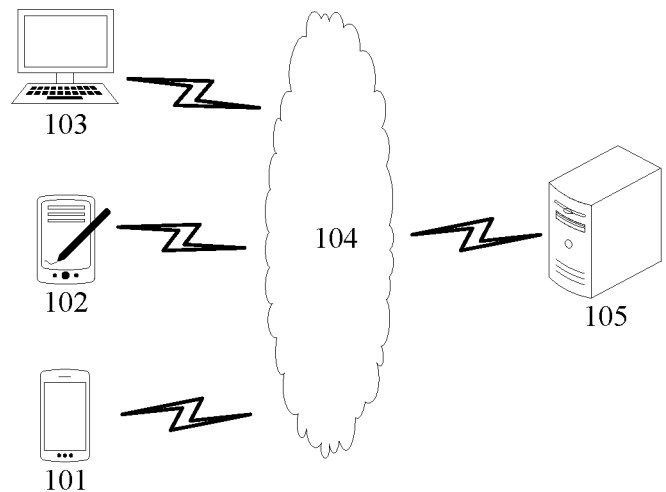
FIG. 1 is a schematic diagram of a system architecture of a packet loss retransmission method according to an embodiment of this application.

Exemplary implementations are now described more comprehensively with reference to the accompanying drawings. However, the examples of implementations may be implemented in multiple forms, and it should not be understood as being limited to the examples of implementations described herein. Conversely, the implementations are provided to make this application more comprehensive and complete, and comprehensively convey the idea of the examples of the implementations to a person skilled in the art. The described features, structures, or characteristics may be combined in one or more implementations in any appropriate manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail in order to avoid overwhelming the subject and thus obscuring various aspects of this application.

In addition, the accompanying drawings are only schematic illustrations of this application and are not necessarily drawn to scale. The same reference numeral in the accompanying drawings represents same or similar components, and therefore repeated descriptions of the components are appropriately omitted. Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks and/or processor apparatuses and/or micro-controller apparatuses.

FIG. 1 is a schematic diagram of a system architecture of a packet loss retransmission method according to an embodiment of this application.

As shown in FIG. 1, the system architecture 100 may include one or more of terminal devices 101, 102, and 103, a network 104, and a server 105. The network 104 is a medium for providing communication links between the terminal devices 101, 102, and 103 and the server 105. The network 104 may include various connection types, for example, a wired or wireless communication link or an optical fiber cable. The terminal devices 101, 102, and 103 may be various electronic devices with display screens, including but not limited to a desktop computer, a portable computer, a smartphone, a tablet, and the like. It is to be understood that the quantities of the terminal devices, the networks, and the servers in FIG. 1 are merely illustrative.

The packet loss retransmission method provided in the embodiments of this application is generally performed by the server 105, and correspondingly, the packet loss retransmission apparatus is generally disposed in the server 105. However, a person of ordinary skill in the art may easily understand that the packet loss retransmission method provided in the embodiments of this application may be alternatively performed by the terminal device 101, 102, or 103, and correspondingly, the packet loss retransmission apparatus may be alternatively disposed in the terminal device 101, 102, or 103. This is not particularly limited in the embodiments of this application. For example, in an exemplary embodiment, the server 105 may obtain a loudness corresponding to a target audio data packet; and retransmit the target audio data packet according to the loudness corresponding to the target audio data packet in response to receiving a packet loss state for representing that the target audio data packet is lost. There may be any quantity of the terminal devices, the networks, and the servers according to implementation requirements.

The terminal device 101, 102, or 103 or the server 105 may be collectively referred to as an electronic device. The terminal device 101, 102, or 103 may be a terminal independent of a transmitter terminal and a receiver terminal, or may be a transmitter terminal or a receiver terminal.

Figure 2:
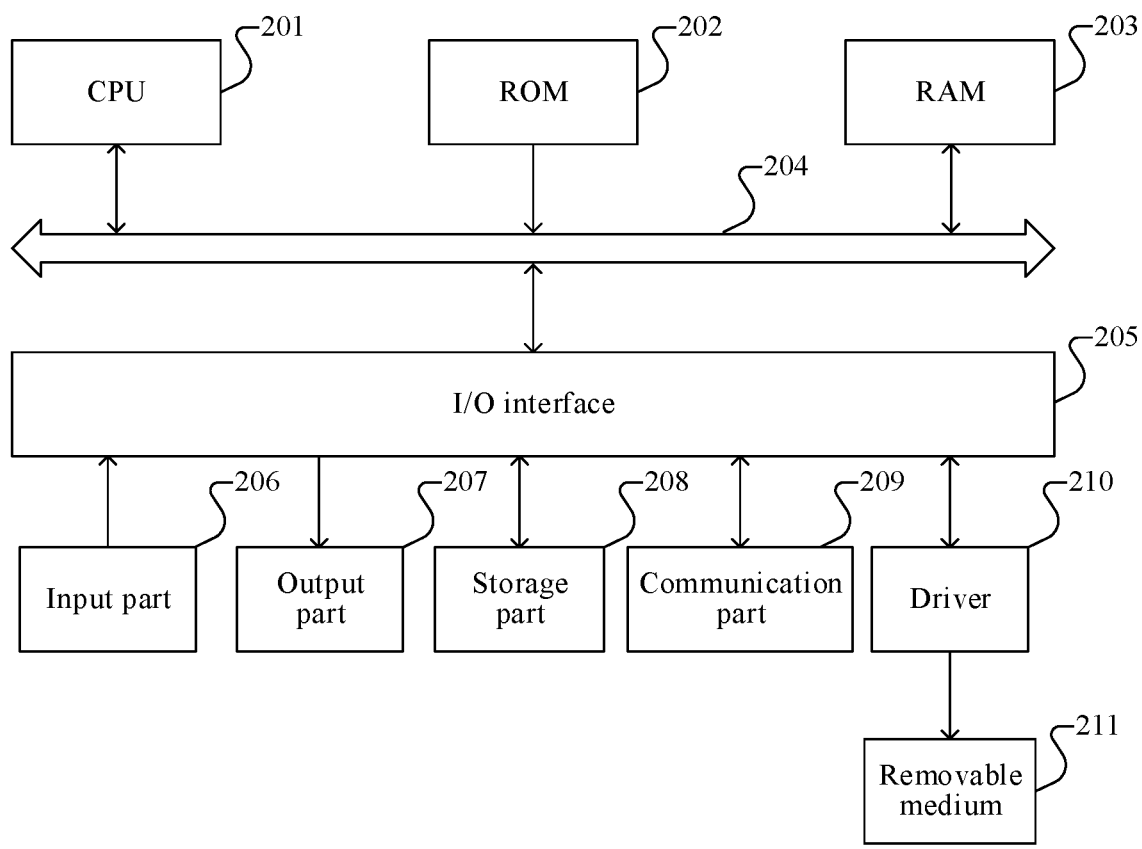
FIG. 2 is a schematic structural diagram of a computer system of an electronic device according to an embodiment of this application.

FIG. 2 is a schematic structural diagram of a computer system of an electronic device according to an embodiment of this application.

The computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201. The CPU 201 may perform various appropriate actions and processing according to a program stored in a read-only memory (ROM) 202 or a program loaded from a storage part 208 to a random access memory (RAM) 203. The RAM 203 further stores various programs and data required for operating the system. The CPU 201, the ROM 202, and the RAM 203 are connected to each other through a bus 204. An input/output (I/O) interface 205 is also connected to the bus 204.

The following components are connected to the I/O interface 205 includes an input part 206 including a keyboard, a mouse, or the like; an output part 207 including a cathode ray tube (CRT), a liquid crystal display (LCD), a speaker, or the like; a storage part 208 including hard disk or the like; and a communication part 209 including a network interface card such as a local area network (LAN) card, a modem, or the like. The communication part 209 performs communication processing by using a network such as the Internet. A driver 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

Particularly, according to the embodiments of this application, the processes described in the following by referring to the flowcharts may be implemented as computer software programs. For example, the embodiments of this application include a computer program product. The computer program product includes a computer program carried on a computer-readable medium. The computer program includes a program code for performing the methods shown in the flowcharts. In such an embodiment, the computer program may be downloaded and installed through the communication part 209 from a network, and/or installed from the removable medium 211. When the computer program is executed by the CPU 201, various functions defined in the method and apparatus of this application are executed.

Generally, it is difficult to avoid packet loss during audio transmission. Causes of packet loss are usually: radio channel interference of WIFI or mobile networks, router congestion in the peak period, and insufficient performance of mobile devices. When an audio data packet is transmitted on the network for an excessively long time, that is, the audio data packet cannot be conveyed in time when needing to be played, and even if the audio data packet is received subsequently, it is determined that the audio data packet is lost. The existing packet loss processing method is generally as follows: When receiving data transmitted by the transmitter terminal, the receiver terminal performs packet loss detection on the data. If packet loss occurs, the packet loss is fed back to the transmitter terminal so that the transmitter terminal performs data retransmission until it is detected that there is no packet loss in the received data.

Figure 3:
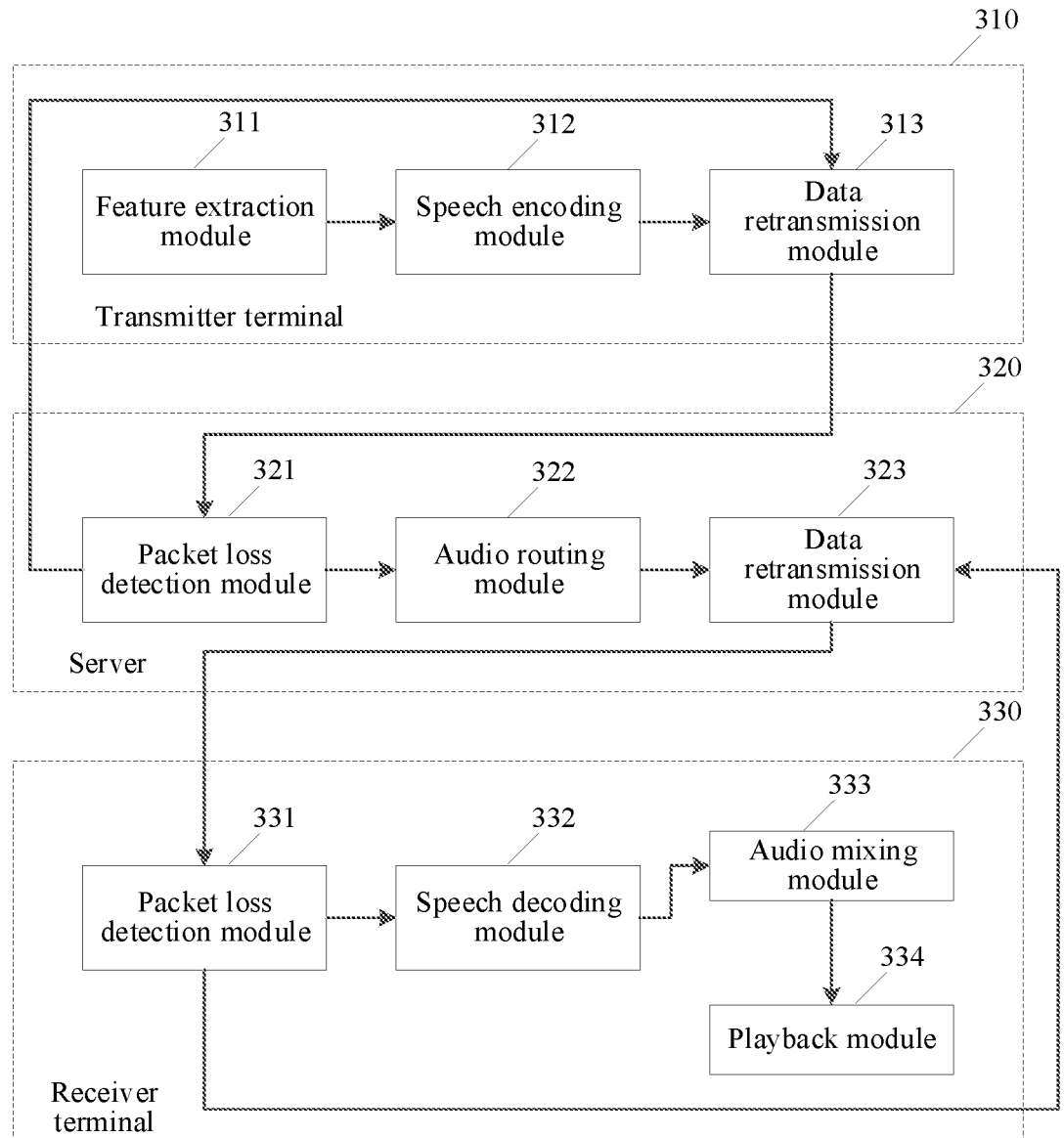
FIG. 3 is an architectural diagram of a packet loss retransmission method according to an embodiment of this application.
Figure 4:
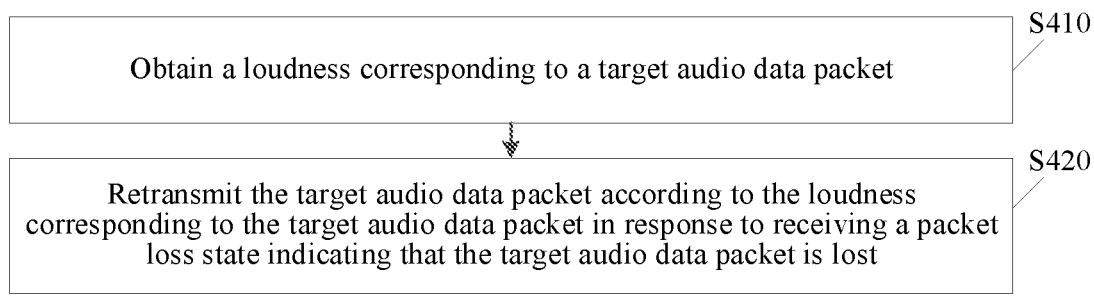
FIG. 4 is a schematic flowchart of a packet loss retransmission method according to an embodiment of this application.

FIG. 3 is an architectural diagram of a packet loss retransmission method according to an embodiment of this application. The architectural diagram shown in FIG. 3 includes: a transmitter terminal 310, a server 320, and a receiver terminal 330. The transmitter terminal 310 includes a feature extraction module 311, a speech encoding module 312, and a data retransmission module 313. The server 320 includes a packet loss detection module 321, an audio routing module 322, and a data retransmission module 323. The receiver terminal 330 includes a packet loss detection module 331, a speech decoding module 332, an audio mixing module 333, and a playback module 334.

The feature extraction module 311 may acquire an audio signal, and perform feature extraction on the acquired audio signal to obtain an audio feature, and transmit the acquired audio signal to the speech encoding module 312. The speech encoding module 312 may encode the audio signal to obtain a corresponding audio bitstream, and transmit the audio bitstream to the data retransmission module 323. The data retransmission module 323 may package the matched audio bitstream and audio feature into an audio data packet, and after a plurality of audio data packets are obtained by packaging, forward the audio data packets to the server 320 as a data group, so that the packet loss detection module 321 in the server 320 performs packet loss detection on the received data group.

When a packet loss detection result includes an audio data packet in a lost state, the packet loss detection module 321 feeds back the lost state to the data retransmission module 313, so that the data retransmission module 313 performs data retransmission for the lost state. Further, when receiving the retransmitted audio data packet and detecting that there is no audio data packet in the lost state in the data group, the packet loss detection module 321 updates the data group according to the retransmitted audio data packet, and transmits the updated data group to the audio routing module 322. Further, the audio routing module 322 may screen the audio data packets in the data group according to the audio feature corresponding to each data packet in the data group, to obtain a target audio data packet. A maximum energy amplitude corresponding to the target audio data packet is greater than that of other audio data packets in the data group, or a similarity between energy spectrum distribution corresponding to the target audio data packet and preset energy spectrum distribution is greater than that of other audio data packets in the data group. Further, the audio routing module 322 may transmit the target audio data packet to the data retransmission module 323, so that the data retransmission module 323 forwards the target audio data packet to the receiver terminal 330. Further, the packet loss detection module 331 in the receiver terminal 330 performs packet loss detection on the target audio data packet.

When a packet loss detection result includes the target audio data packet in a lost state, the packet loss detection module 331 feeds back the lost state to the data retransmission module 323, so that the data retransmission module 323 performs data retransmission for the lost state. Further, when receiving the retransmitted target audio data packet and detecting that there is no target audio data packet in the lost state in all target audio data packets, the packet loss detection module 331 updates all the target audio data packets according to the retransmitted target audio data packet, and transmits all the updated target audio data packets to the speech decoding module 332. Further, the speech decoding module 332 may decode the audio bitstream in each target audio data packet into an audio signal, and transmit the decoded audio signal to the audio mixing module 333, so that the audio mixing module 333 performs audio mixing on the audio signal. Further, the audio mixing module 333 may transmit an audio mixing result to the playback module 334, so that the playback module 334 plays the audio mixing result.

In the foregoing packet loss retransmission method, each data packet transmission process may include a plurality of audio data packets that need to be transmitted. When the plurality of audio data packets are all completely received (that is, there is no packet loss), the next module can be triggered to perform the corresponding operation. When the audio signal is applied to the field of a multi-person conference, the quantity of audio signal acquisition is large, and if the foregoing method is used for packet loss retransmission, the problem of low data transmission efficiency is easily caused, which leads to a long time difference between a moment at which the receiver terminal plays the audio and a moment at which the transmitter terminal transmits the audio, which affects real-time performance of an audio output in the multi-person conference and user experience.

In addition, for the multi-person conference, when a multi-channel audio signal is played, a user is usually less perceptive to an audio signal with a weaker loudness. Therefore, in the embodiments of this application, the audio signal with a weaker loudness that is not easily perceived by a user may be used as a screening condition of the audio data packet, to determine whether to retransmit the lost audio data packet. If the server can not only screen the audio data packets according to the energy of the audio data packets, but also perform secondary screening on the screened audio data packets through the loudness of the audio data packets, and then transmit the audio data packets after the secondary screening to the receiver terminal, the data transmission efficiency when the packet loss occurs can be improved, and the time difference between the moment at which the receiver terminal plays the audio and the moment at which the transmitter terminal transmits the audio can be shortened, thereby improving the real-time performance of the audio output in the multi-person conference and the user experience.

Based on the foregoing problem, the embodiments of this application provide a packet loss retransmission method. The packet loss retransmission method may be applied to the foregoing server 105, or may be applied to one or more of the foregoing terminal devices 101, 102, and 103. This is not particularly limited in the embodiments of this application. Next, the packet loss retransmission method is described mainly by taking the server as an execution entity as an example. Referring to FIG. 3, the packet loss retransmission method may include the following S410 and S420:

S410: Obtain a loudness corresponding to a target audio data packet.

S420: Retransmit the target audio data packet according to the loudness corresponding to the target audio data packet in response to receiving a packet loss state for representing that the target audio data packet is lost.

S410 and S420 may be performed by the server. For example, the server may be a routing server for selecting a channel signal.

By implementing the method shown in FIG. 1, the loudness corresponding to the audio data packet can be used as the data retransmission condition, thereby alleviating the problem of long data retransmission time and improving the data transmission efficiency. In addition, the target audio data packet can be retransmitted in a targeted manner. Compared with the related art, retransmitting all the data packets including the target audio data packet and transmitted in the current time can reduce the amount of retransmitted data and reduce the occupation of network resources.

The foregoing steps of the embodiments of this application are described in more detail below.

In S410, the loudness corresponding to the target audio data packet is obtained.

The server may receive the plurality of audio data packets transmitted by the transmitter terminal. The target audio data packet is one or more of the plurality of audio data packets. Because not all conference members in the multi-person conference are talking, and some conference members may remain silent, audio data packets transmitted by the transmitter terminal corresponding to the conference members remaining silent at this time do not need to be transmitted to the receiver terminal. In this case, in the embodiments of this application, before obtaining the loudness corresponding to the target audio data packet, the server may screen the target audio data packet whose audio feature meets a preset condition from the plurality of obtained audio data packets.

The audio data packet may include a loudness corresponding to the audio data packet, an audio bitstream, and an audio feature corresponding to the audio bitstream. The audio feature corresponding to the audio bitstream may include energy distribution corresponding to the audio bitstream and an energy amplitude corresponding to each frequency in the audio bitstream. There may be one or more target audio data packets.

It may be learned that, by implementing some embodiments, the amount of forwarded data can be reduced by screening the obtained audio data packets, thereby reducing the loss of network resources and improving the data transmission efficiency.

In the embodiments of this application, when the transmitter terminal transmits the plurality of audio data packets to the server, the packet loss may also occur. Therefore, before screening the target audio data packet whose audio feature meets the preset condition from the plurality of audio data packets, the packet loss detection may be performed on the plurality of received audio data packets. When a packet loss detection result includes a lost state, the lost state is fed back to a transmitter terminal, so that the transmitter terminal performs data retransmission for the lost state.

It may be understood that there may be one or more transmitter terminals. This is not limited in the embodiments of this application. When the embodiments of this application are applied to the multi-person conference, a conference member terminal in the multi-person conference may be used as the transmitter terminal and may also be used as the receiver terminal. In addition, the plurality of audio data packets may belong to the same data group. The transmitter terminal may transmit one data group at a time. Each data group includes one or more audio data packets. The plurality of audio data packets correspond to different audio channels.

In some embodiments, the method for performing packet loss detection on the plurality of received audio data packets may be specifically: determining sequence numbers respectively corresponding to the plurality of audio data packets received within a unit time (for example, 5 s). Further, according to a packet header (for example, consecutive numbers of the sequence numbers) of a data transmission protocol (for example, a TCP protocol), continuity of the sequence numbers respectively corresponding to the plurality of audio data packets is detected. If the sequence numbers respectively corresponding to the plurality of audio data packets are not consecutive (for example, 1, 2, 4, 5), it is determined that the packet loss occurs. If the sequence numbers respectively corresponding to the plurality of audio data packets are consecutive (for example, 1, 2, 3, 4), it is determined that no packet loss occurs. When no packet loss occurs, packet loss states respectively corresponding to the plurality of audio data packets are non-lost states. Further, the lost data packet corresponding to the packet loss is determined according to the sequence numbers respectively corresponding to the plurality of audio data packets. Further, a packet loss detection result is generated according to the lost data packet. There may be one or more lost data packets. This is not limited in the embodiments of this application. In addition, the packet loss detection result may include at least one of the lost data packet, the sequence number corresponding to the lost data packet, and the packet loss state corresponding to the lost data packet. The packet loss state may be represented by a value 0 or 1. The value 0 may represent the lost state in the packet loss detection result, and the value 1 may represent the non-lost state in the packet detection result.

In some embodiments, the method for feeding back the loss state to the transmitter terminal may be specifically: feeding back a negative feedback (Negative Acknowledgement, NACK) signal including the packet loss detection result to the transmitter terminal. It may be understood that, in some embodiments, when the packet loss detection result does not include the lost state, the following step may be included: transmitting a positive feedback (Acknowledgement, ACK) signal for representing that the data reception is normal to the transmitter terminal.

In some embodiments, the method for the transmitter terminal to retransmit the data for the lost state may be as follows: A transmitter client determines the lost data packet corresponding to the lost state, and retransmits the lost data packet; or a transmitter client retransmits the data group corresponding to the lost state, the data group including the plurality of audio data packets.

It may be learned that, by implementing such embodiments, the transmitter terminal can be triggered to perform data retransmission when the packet loss state is detected, which can improve integrity of the transmitted data.

In the embodiments of this application, after the transmitter terminal retransmits the data for the lost state, and before screening the target audio data packet whose audio feature meets a preset condition from the plurality of obtained audio data packets, the method further includes: updating the plurality of audio data packets according to the retransmitted data packet.

There may be one or more retransmitted data packets, and the plurality of updated audio data packets include the retransmitted data packet.

In some embodiments, the method for updating the plurality of audio data packets according to the retransmitted data packet may be specifically: determining a sequence number corresponding to the retransmitted data packet and sequence numbers respectively corresponding to the plurality of audio data packets, integrating the retransmitted data packet and the plurality of audio data packets in sequence according to the sequence numbers, to update the plurality of audio data packets.

It may be learned that, by implementing such embodiments, integrity of the data transmitted to the receiver terminal can be ensured by updating the data packet.

In the embodiments of this application, the plurality of received audio data packets may be transmitted by the transmitter terminal.

The method for the transmitter terminal to transmit the plurality of audio data packets is specifically as follows: The transmitter terminal acquires an audio signal and performs feature extraction on the audio signal to obtain an audio feature; the transmitter terminal encodes the audio signal to obtain an audio bitstream; and the transmitter terminal packages the audio bitstream and the audio feature into an audio data packet and transmits the audio data packet to the server.

The audio signal acquired by the transmitter terminal may be an analog signal. The audio bitstream is used for representing data traffic used by the audio signal within a unit time, Audio bitstream=Sampling rate*Number of bits*Sound channel, for example, 44100*16*2=1.41 Mbit/sec.

In some embodiments, the audio feature corresponding to the audio signal may include at least one of a zero-crossing rate, short-term energy, a short-term autocorrelation function, and a short-term average amplitude difference. This is not limited in the embodiments of this application.

When the audio feature corresponding to the audio signal includes the zero-crossing rate, the method for the transmitter terminal to acquire the audio signal and perform feature extraction on the audio signal to obtain the audio feature may be specifically as follows: The transmitter terminal acquires the audio signal, and calculates the zero-crossing rate of the audio signal as the audio feature of the audio signal according to $Z_n = \frac{1}{2}\Sigma_{m=0}^{N-1}|\text{sgn}[x_n(m)] - \text{sgn}[x_n(m-1)]|$. N is the frame length of the audio signal, and n is the number of frames of the audio signal. The calculated zero-crossing rate may be used for representing the number of times of each frame of the audio signal passing through the zero value. Unvoiced and voiced sounds in the audio signal may be determined through the zero-crossing rate, which helps the server to screen the plurality of received audio data packets.

When the audio feature corresponding to the audio signal includes the short-term energy, the method for transmitter terminal to acquire the audio signal and perform feature extraction on the audio signal to obtain the audio feature may be specifically as follows: The transmitter terminal acquires the audio signal and detects the short-term energy $E_n$ of an $n^{th}$ frame of the audio signal $x_n(m)$ in the acquired audio signal according to $E_n = \Sigma_{m=0}^{N-1} x_n^2(m)$, to obtain the short-term energy corresponding to each frame as the audio feature of the audio signal. N is the frame length of the audio signal, and n is a positive integer. Generally, the energy of human voice is larger than that of noise. The calculated short-term energy corresponding to each frame can be used for distinguishing the human voice and the noise in the audio signal, which helps the server to screen out the noise of the plurality of received audio data packets according to the energy corresponding to each frame, thereby improving the processing efficiency of the audio data.

When the audio feature corresponding to the audio signal includes the short-term autocorrelation function, the method for the transmitter terminal to acquire the audio signal and perform feature extraction on the audio signal to obtain the audio feature may be specifically as follows: The transmitter terminal acquires the audio signal, and calculates the short-term autocorrelation function of the audio signal as the audio feature of the audio signal according to $R_n(k) = \Sigma_{m=0}^{N-1-k}[x(n+m)w'(m)][x(n+m+k)w'(m+k)]$. N is the frame length of the audio signal, n is a positive integer, w is used for representing a window function, and w'(m) is used for representing a windowed audio frame. The calculated short-term autocorrelation function can be used for measuring a similarity of time waveforms of the signal, which helps the server to detect a similar property of the audio according to the short-term autocorrelation function, thereby improving the processing efficiency of the audio data.

When the audio feature corresponding to the audio signal includes the short-term average amplitude difference, the method for the transmitter terminal to acquire the audio signal and perform feature extraction on the audio signal to obtain the audio feature may be specifically as follows: The transmitter terminal acquires the audio signal, and calculates the short-term average amplitude difference of the audio signal as the audio feature of the audio signal according to $r_n(k) = \Sigma_0^{N-1}|x(n) - x(n+k)|$. k=0, 1, ..., N−1, and the calculated short-term average amplitude difference may be used for measuring the change of the audio amplitude.

In addition, the audio feature corresponding to the audio signal may further include a feature such as a spectrogram, short-term power spectrum density, spectral entropy, fundamental frequency, or a formant. This is not limited in the embodiments of this application.

It may be learned that, by implementing some embodiments, the transmitter terminal can perform the feature extraction on the audio signal, which can help the server to select a channel signal according to the feature extraction result, thereby ensuring the real-time performance of the audio output of the multi-person conference, and ensuring the audio output effect.

In the embodiments of this application, during screening of the target audio data packets whose audio feature meets a preset condition, the preset condition used includes a preset energy amplitude and/or a preset signal-to-noise ratio. The method for screening the target audio data packet whose audio feature meets the preset condition from the plurality of obtained audio data packets may be: determining the audio data packet to which the audio bitstream corresponding to the audio feature belongs as the target audio data packet in response to detecting that there is at least one energy amplitude greater than the preset energy amplitude in the audio feature; and/or determining the audio data packet to which the audio bitstream corresponding to the audio feature belongs as the target audio data packet in response to detecting that there is at least one signal-to-noise ratio greater than the preset signal-to-noise ratio in the audio feature.

For example, each audio frame in the audio bitstream corresponds to an energy amplitude. The energy amplitude is used for representing the short-term energy corresponding to the audio frame. The signal-to-noise ratio (Signal-to-Noise Ratio) is a ratio of an average power of the audio signal to an average power of the noise, that is:

$$\text{Signal-to-noise ratio (dB)} = 10 * \log 10\left(\frac{S}{N}\right)(\text{dB}).$$

It may be learned that, by implementing some embodiments, the audio data packets can be screened according to the energy amplitude or the signal-to-noise ratio, to reduce the audio data packets that need to be transmitted and improve the data transmission efficiency.

In the embodiments of this application, the method for obtaining the loudness corresponding to the target audio data packet may be: framing the audio bitstream in the target audio data packet according to a preset duration, to obtain a plurality of audio frames; processing the plurality of audio frames respectively through a preset window function, to obtain a plurality of reference frames; calculating a power spectrum respectively corresponding to the plurality of reference frames; and calculating the loudness corresponding to the target audio data packet according to the power spectrum.

It may be understood that, in the embodiments of this application, the electronic device that performs the packet loss retransmission method can calculate the loudness corresponding to the target audio data packet according to the foregoing method. If the electronic device that performs the packet loss retransmission method is a server, the loudness corresponding to the target audio data packet may be calculated by the server according to the foregoing method. Certainly, the loudness corresponding to the target audio data packet may also be calculated by the transmitter terminal according to the foregoing method, and the server directly obtains the loudness corresponding to the target audio data packet from the transmitter terminal.

The durations corresponding to the plurality of audio frames are the same (for example, 10 ms or 20 ms), and the durations corresponding to the plurality of reference frames are the same. In addition, because fast Fourier transform (FFT) can only transform time-domain data of a limited length, a time-domain signal needs to be truncated. Even if the time-domain signal is a periodic signal, if the time length of the truncated periodic signal is not an integer multiple of the period, the truncated signal easily leaks. Therefore, this application applies a preset window function allowing the audio signal in the time domain to meet a periodicity requirement of the Fourier transform, to reduce signal leakage. The preset window function is a Hanning window function, a Hamming window function, a Blackman window function, a Keiser window function, a triangular window function, or a rectangular window function.

In some embodiments, the method for processing the plurality of audio frames respectively through a preset window function, to obtain a plurality of reference frames may be: determining time-domain expressions respectively corresponding to the plurality of audio frames; and dot-multiplying the time-domain expressions respectively corresponding to the plurality of audio frames with the preset window function, to obtain the reference frames respectively corresponding to the plurality of audio frames.

In some embodiments, the method for calculating the power spectrum respectively corresponding to the plurality of reference frames may be: performing the FFT on the plurality of reference frames to determine the power spectrum respectively corresponding to the plurality of reference frames.

It may be learned that, by implementing some embodiments, the loudness of the target audio data packet can be obtained through calculation, and the loudness can be used as the data retransmission condition. When the loudness is low, the server may not retransmit the lost target audio data packet, to reduce the occupation of network resources.

In the embodiments of this application, a possible implementation of calculating the loudness corresponding to the target audio data packet according to the power spectrum may be: calculating a frequency loudness of each frequency in the power spectrum according to the energy amplitude of each frequency in the power spectrum; calculating a loudness weight of each frequency in the power spectrum according to the frequency loudness; calculating a weighted sum between the energy amplitude of each frequency in the power spectrum and the loudness weight of each frequency in the power spectrum as a loudness value of the reference frame corresponding to the power spectrum; and determining a sum of the loudness values corresponding to the plurality of reference frames as the loudness corresponding to the target audio data packet.

The frequency is a number of fixed frequency, and may be used as unique representation of the fixed frequency.

In some embodiments, the method for calculating the frequency loudness of each frequency in the power spectrum according to the energy amplitude of each frequency in the power spectrum may be specifically: determining an absolute value P(i,j) of the energy amplitude of each frequency i in the power spectrum, where j=0~K−1, and K is a total quantity of the frequencies.

In some embodiments, the method for calculating the loudness weight of each frequency in the power spectrum according to the frequency loudness may be specifically: calculating the loudness weight cof(freq) of each frequency freq in the power spectrum based on the following formulas, where freq⊆[j−1, j].

$$afy = af(j-1) + (freq - ff(j-1)) * \frac{af(j) - af(j-1)}{ff(j) - ff(j-1)};$$

-continued $$bfy = bf(j-1) + (freq - ff(j-1)) * \frac{bf(j) - bf(j-1)}{ff(j) - ff(j-1)};$$

$$cfy = cf(j-1) + (freq - ff(j-1)) * \frac{cf(j) - cf(j-1)}{ff(j) - ff(j-1)};$$

Loudness loud of $freq = 4.2 + afy*(dB - cfy)/(1 + bfy*(dB - cfy));$ and $cof(freq) = \frac{10^{\frac{loud}{20}}}{1000}$, where freq is a frequency value of the frequency for which a perceptual coefficient needs to be calculated (for example, a center frequency value of a frequency band corresponding to the frequency); ff, af, bf, and, cf are data in an equal-loudness curve data table disclosed by BS3383; and loud represents a loudness of the frequency freq, and cof(freq) represents a perceptual coefficient corresponding to the frequency freq.

Figure 5:
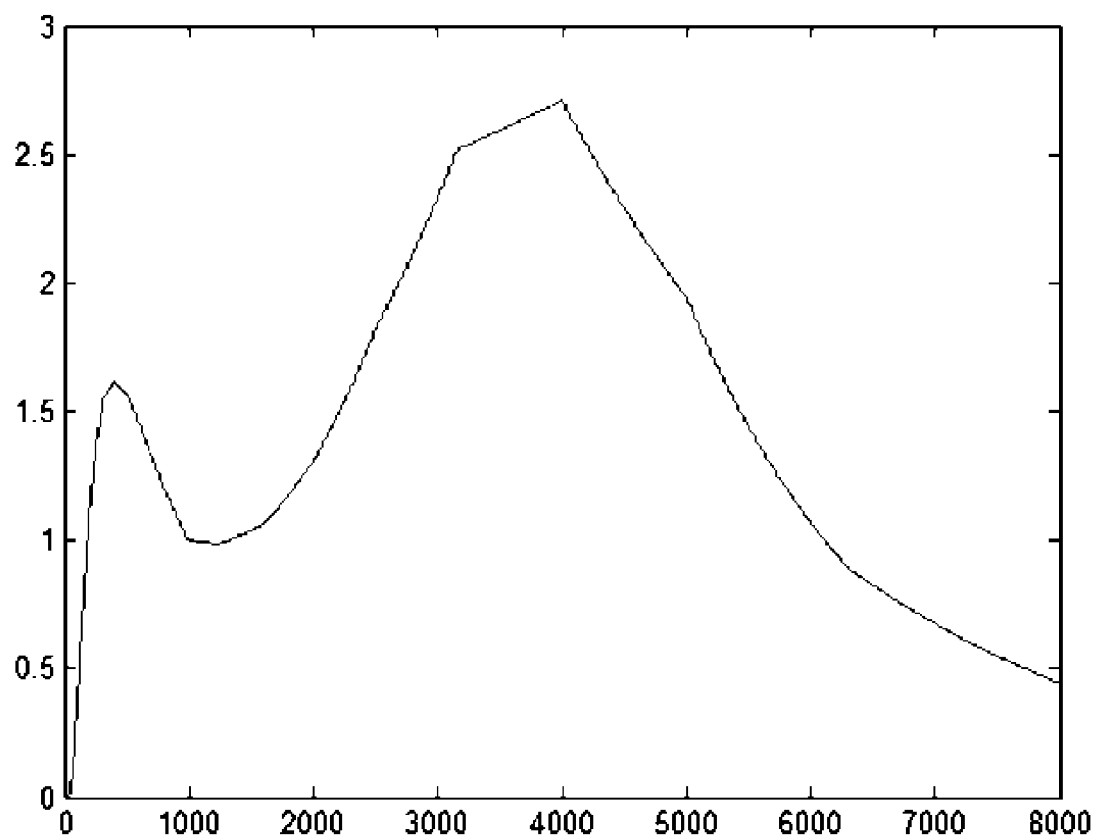
FIG. 5 is a schematic curve diagram of a loudness weight according to an embodiment of this application.

Refer to FIG. 5 in combination with the expression of cof(freq). FIG. 5 is a schematic curve diagram of a loudness weight according to an embodiment of this application. In the curve diagram shown in FIG. 5, a horizontal axis is used for representing frequency, and a vertical axis is used for representing a loudness weight. When a frequency loudness is known, the weight corresponding to the frequency may be determined by the curve diagram shown in FIG. 5.

In some embodiments, the method for calculating the weighted sum between the energy amplitude of each frequency in the power spectrum and the loudness weight of each frequency in the power spectrum as the loudness value of the reference frame corresponding to the power spectrum may be specifically: using the weighted sum between the energy amplitude of each frequency in the power spectrum and the loudness weight of each frequency in the power spectrum as the loudness value EP(i) of the reference frame corresponding to the power spectrum, where i is a frame sequence number, and k is a frequency sequence number.

It may be learned that, by implementing some embodiments, the loudness corresponding to the target audio data packet can be determined as the data retransmission condition according to the loudness corresponding to each frequency, thereby improving the data retransmission efficiency of the server.

In S420: the target audio data packet is retransmitted according to the loudness corresponding to the target audio data packet when a packet loss state for representing that the target audio data packet is lost is received.

In the embodiments of this application, the implementation of retransmitting the target audio data packet according to the loudness corresponding to the target audio data packet may be: retransmitting the target audio data packet to the receiver terminal when the loudness corresponding to the target audio data packet is greater than a preset loudness, so that the receiver terminal decodes and outputs the target audio data packet after retransmission and the target audio data packet before retransmission; and skipping retransmitting the target audio data packet to the receiver terminal when the loudness corresponding to the target audio data packet is less than the preset loudness.

The loudness is a subjective perceived quantity for describing the amplitude of sound, and the unit is sone. A loudness with a 1000 Hz pure sound and a sound pressure level of 40 dB is 1 sone. A sound of 2 sones is twice as loud as a sound of 40 squares. A sound of 4 sones is 4 times as loud as the sound of 40 squares. That is, when the sound pressure level increases by 10 dB, the loudness doubles.

Figure 6:
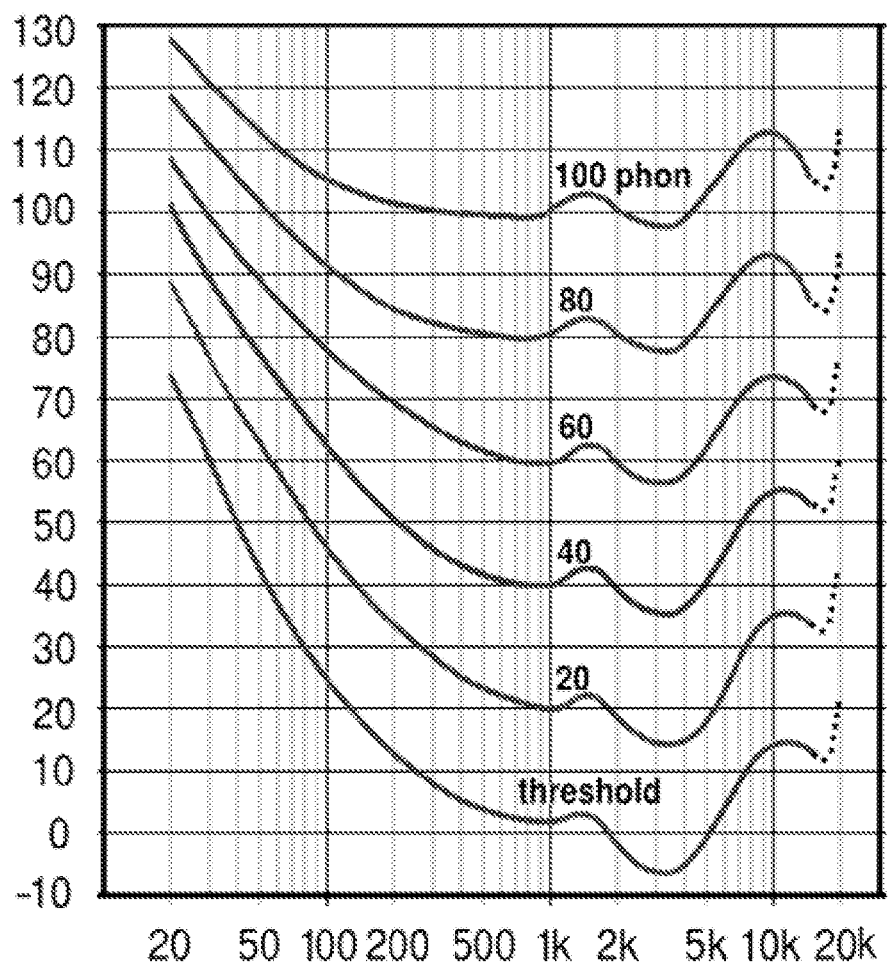
FIG. 6 is a schematic diagram of an acoustic equal loudness curve according to an embodiment of this application.

Perception of human ears to the loudness changes with the sound pressure level. FIG. 6 is a schematic diagram of an acoustic equal loudness curve according to an embodiment of this application. Curves for various loudness levels (that is, 100 phon, 80 phon, 60 phon, 40 phon, 20 phon, or a threshold phon) are shown in the acoustic equal loudness curve shown in FIG. 6. A horizontal axis is used for representing sound wave frequency. A vertical axis is used for representing a sound pressure level. According to the acoustic equal loudness curve diagram shown in FIG. 6, it may be learned that the acoustic equal loudness curve is a curve describing a relationship between the sound pressure level and the sound wave frequency under an equal loudness condition. In middle and low frequencies (below 1 kHz), the lower frequency indicates that the equal loudness needs greater sound pressure intensity (energy). That is, the greater sound energy indicates that auditory perception of the human ears is more consistent. In the middle and high frequencies (above 1 kHz), the frequencies of different frequency bands correspond to different acoustic auditory perception features. Referring to FIG. 6, it may be learned that, if the audio data packet is screened through the loudness, sounds with relatively weak perception of human ears can be screened out, which can improve the data transmission effect.

In some embodiments, the method for retransmitting the target audio data packet to the receiver terminal when the loudness corresponding to the target audio data packet is greater than a preset loudness may be: detecting whether the loudness corresponding to the target audio data packet is greater than the preset loudness C; if yes, triggering to switch on a data retransmission function (that is, triggering an enable switch AmEnable=1), and retransmitting the target audio data packet to the receiver terminal through the data retransmission function; and if not, switching off the data retransmission function (that is, triggering the enable switch AmEnable=0). That is, the target audio data packet may be retransmitted to the receiver terminal according to the following expression $$\begin{cases} ArqEnable = 1, EP(i) \geq C \\ ArqEnable = 0, EP(i) < C \end{cases}.$$

It may be learned that, by implementing some embodiments, the audio data packets can be screened according to the loudness, which reduces the occupation of network resources by the sounds with relatively weak perception of human ears, thereby improving the data transmission efficiency. In addition, in this application, the lost data packet can be retransmitted. Therefore, this application can resolve the problem of low transmission efficiency caused by retransmitting all data of the entire data group for each retransmission in the related art.

In the embodiments of this application, the method for the receiver terminal to decode and output the target audio data packet after retransmission and the target audio data packet before retransmission may be as follows: The receiver terminal decodes the target audio data packet after retransmission and the target audio data packet before retransmission, to obtain a plurality of to-be-outputted audio signals; and performs audio mixing on the plurality of to-be-outputted audio signals to obtain and play a mixed audio signal.

In some embodiments, before the receiver terminal performs the audio mixing on the plurality of to-be-outputted audio signals, the following steps may be further included:

The receiver terminal normalizes formats of the plurality of to-be-outputted audio signals, to ensure that the formats of the plurality of to-be-outputted audio signals are unified; further converts the plurality of to-be-outputted audio signals into a preset sampling rate (for example, 16 kHz, 32 kHz, 44.1 kHz, or 48 kHz); further detects consistency of bit depths or sample formats of the plurality of to-be-outputted audio signals, and if the bit depths are inconsistent or the sample formats are inconsistent, performing corresponding normalization on the plurality of to-be-outputted audio signals, so that the number of bits carrying audio data of each sampling point is the same; and further detects whether sound channels (for example, mono channel or dual channels) of the plurality of to-be-outputted audio signals are consistent, if the sound channels are consistent, outputting a prompt message indicating that the channels are inconsistent, and if the channels are inconsistent, performing the operation of performing the audio mixing on the plurality of to-be-outputted audio signals. In addition, in some embodiments, before the receiver terminal performs audio mixing on the plurality of to-be-outputted audio signals, the receiver terminal may further perform processing such as echo cancellation, noise suppression, or silence detection on the plurality of to-be-outputted audio signals. This is not limited in the embodiments of this application.

In some embodiments, the method for the receiver terminal to perform audio mixing on the plurality of to-be-outputted audio signals, to obtain a mixed audio signal may be: The receiver terminal performs equalizing regulation on volumes of the plurality of to-be-outputted audio signals according to the energy amplitudes respectively corresponding to the plurality of to-be-outputted audio signals, and mixes results of the equalizing regulation to obtain the mixed audio signal.

In some embodiments, after the receiver terminal performs audio mixing on the plurality of to-be-outputted audio signals to obtain the mixed audio signal, the following step may be further included: The receiver terminal performs overflow detection on the mixed audio signal; and if there is an overflow, performs overflow processing/smoothing processing on overflowed sampling points, and then plays a processing result.

It may be learned that, by implementing some embodiments, after receiving a plurality of complete audio data packets, the receiver terminal can perform audio mixing on the plurality of complete audio data packets for output. The output result retains important audio content in the conference and discards audio content with weak perception of human ears, which can improve message forwarding efficiency of the multi-person conference, and ensure the real-time performance of the outputted audio signal, thereby improving the user experience.

Figure 7:
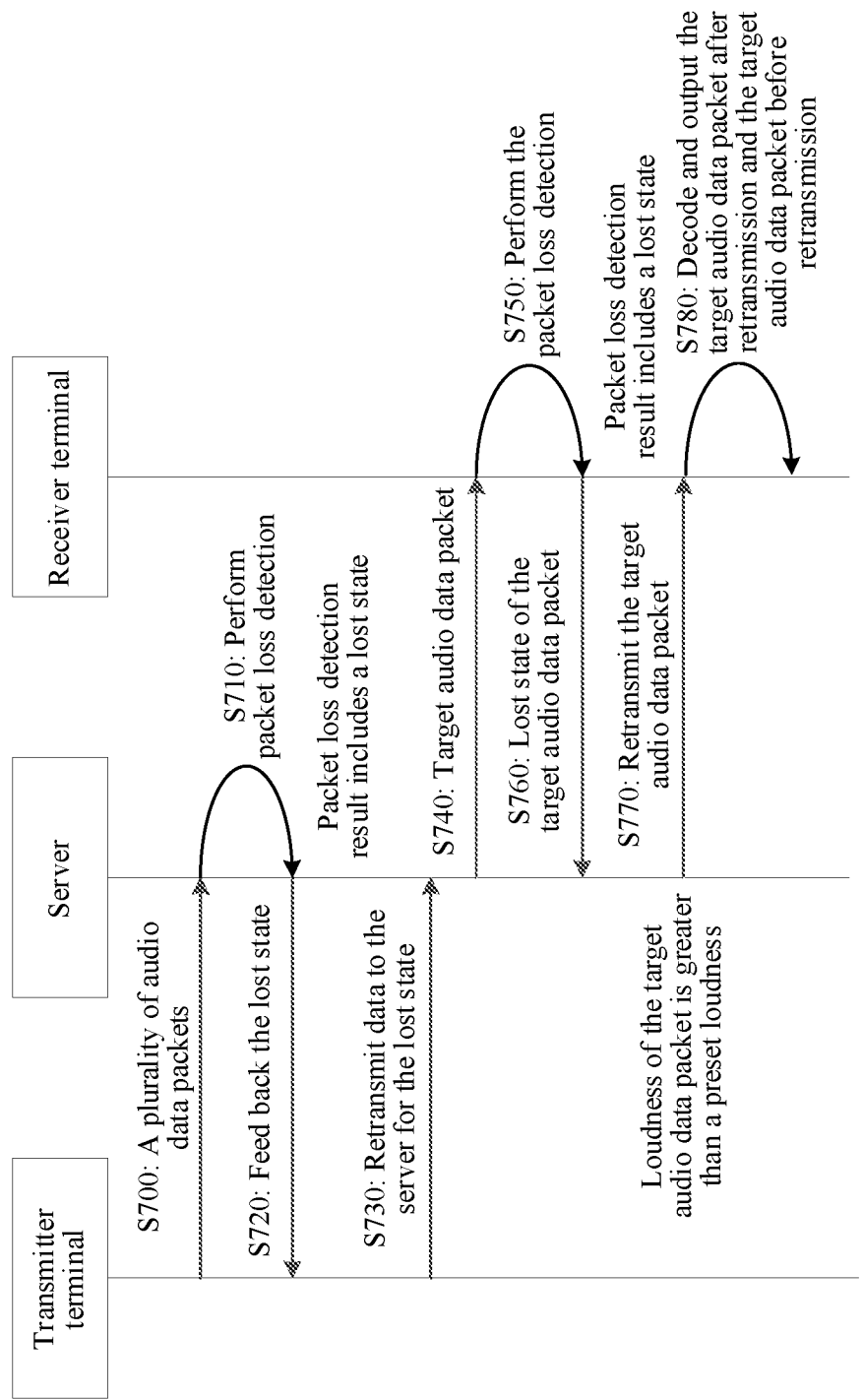
FIG. 7 is a schematic timing diagram of a packet loss retransmission method according to an embodiment of this application.

FIG. 7 is a schematic timing diagram of a packet loss retransmission method according to an embodiment of this application. As shown in FIG. 7, the method includes S700 to S780.

In S700, a transmitter terminal transmits a plurality of audio data packets to a server.

The transmitter terminal may perform feature extraction on an acquired audio signal to obtain an audio feature; encode the audio signal to obtain an audio bitstream corresponding to the audio signal; package a loudness corresponding to the audio data packet, the audio bitstream, and the audio feature into an audio data packet; and transmit a plurality of the audio data packets obtained by packaging to the server.

In S710, the server may perform packet loss detection after receiving the plurality of audio data packets.

In S720, when a packet loss detection result includes a lost state, the server feeds back the lost state to the transmitter terminal.

In S730, the transmitter terminal retransmits data to the server for the lost state.

In S740, the server forwards a target audio data packet determined from the plurality of audio data packets to a receiver terminal.

The server may update the plurality of audio data packets according to the retransmitted data packet, screen a target audio data packet whose audio feature meets a preset condition from the plurality of audio data packets, and forward the target audio data packet to the receiver terminal.

In S750, after receiving the target audio data packet, the receiver terminal may perform packet loss detection.

In S760, when a packet loss detection result includes a lost state, the receiver terminal feeds back the lost state of the target audio data packet to the server.

In S770, when a loudness of the target audio data packet is greater than a preset loudness, the server retransmits the target audio data packet to the receiver terminal.

In S780, the receiver terminal decodes and outputs the target audio data packet after retransmission and the target audio data packet before retransmission.

In some embodiments, the audio data packet may not include the loudness. After the transmitter terminal transmits the audio data packet to the server, the server may calculate the loudness corresponding to the audio signal according to the audio feature in the audio data packet.

It may be learned that, by implementing the method shown in FIG. 7, the data retransmission function can be switched on for audio data with relatively strong perception of human ears, and the data retransmission function is not switched on for audio data with relatively weak perception of human ears to ensure data transmission quality. Further, the transmission quality of a main sound source in a multi-person network call can ensure to a maximum extent, which can avoid unnecessary consumption of network bandwidth resources, and reduce poor user call experience caused by the increase of call delay caused by packet loss retransmission under no screening condition.

Figure 8:
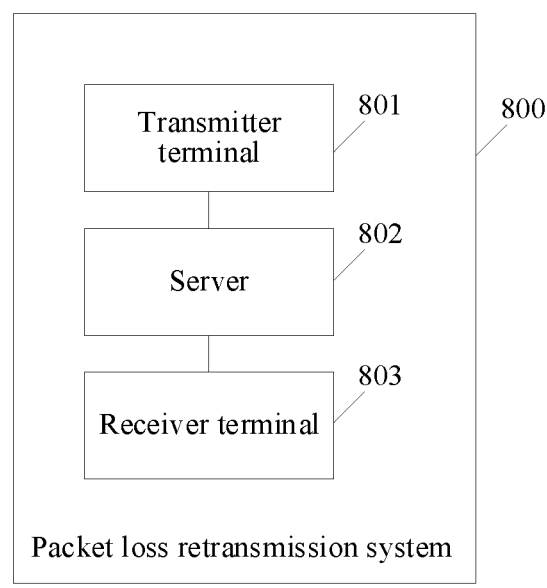
FIG. 8 is a schematic structural block diagram of a packet loss retransmission system according to an embodiment of this application.

In an embodiment of this application, a packet loss retransmission system 800 is further provided. Referring to FIG. 8, the system 800 includes: a transmitter terminal 801, a server 802, and a receiver terminal 803.

The transmitter terminal 801 is configured to transmit a target audio data packet to the server 802.

The server 802 is configured to obtain a loudness corresponding to the target audio data packet.

The receiver terminal 803 is configured to receive the target audio data packet, and transmit a packet loss state for representing that the target audio data packet is lost to the server 802.

The server 802 is further configured to retransmit the target audio data packet to the receiver terminal 803 according to the loudness corresponding to the target audio data packet in response to receiving the packet loss state.

It may be learned that, by implementing the system shown in FIG. 8, the loudness corresponding to the audio data packet can be used as the data retransmission condition, thereby alleviating the problem of long data retransmission time and improving the data transmission efficiency. In addition, the target audio data packet can be retransmitted in a targeted manner. Compared with the related art, retransmitting all the data packets including the target audio data packet and transmitted in the current time can reduce the amount of retransmitted data and reduce the occupation of network resources.

Figure 9:
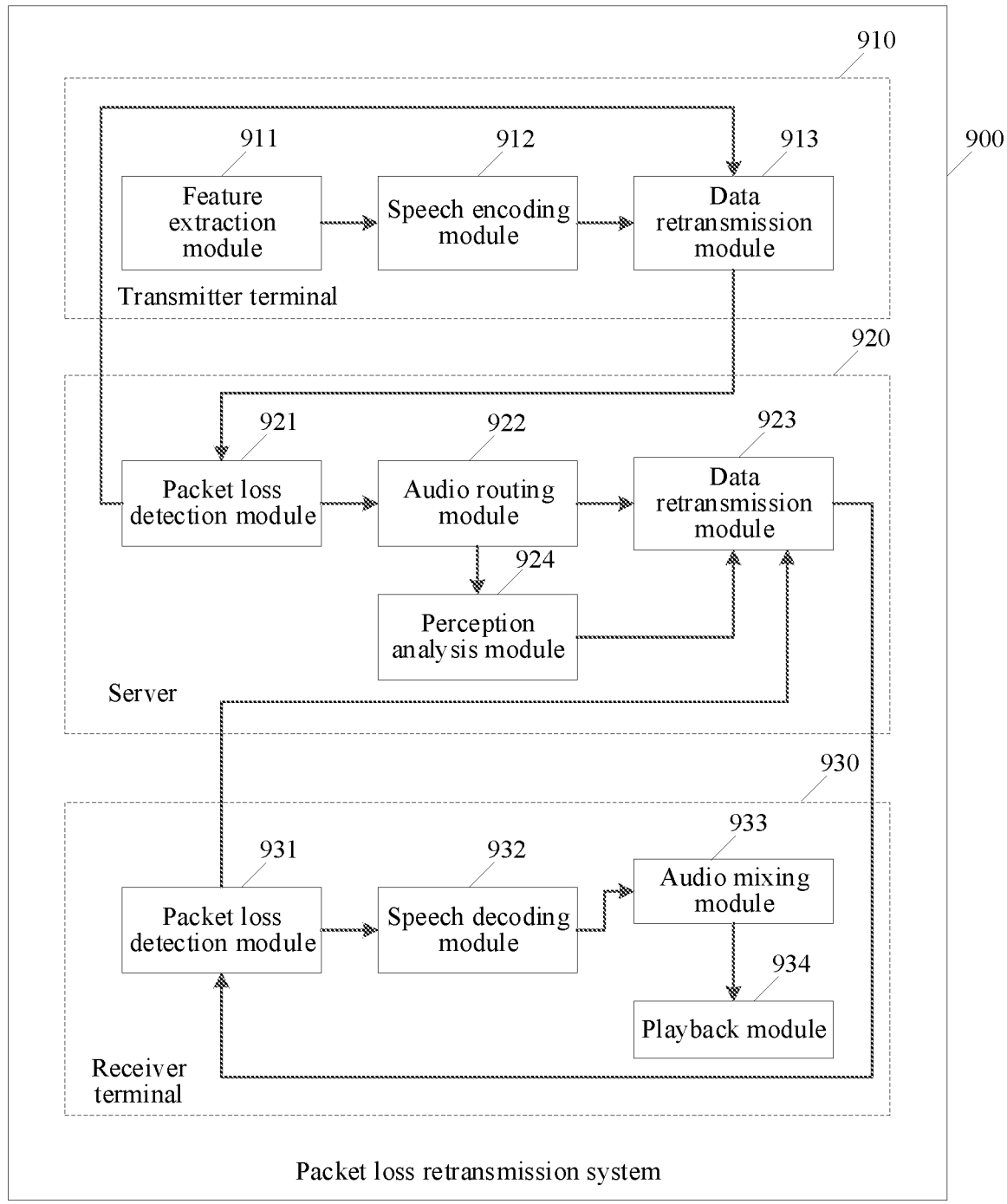
FIG. 9 is a schematic structural block diagram of a packet loss retransmission system according to another embodiment of this application.

FIG. 9 is a schematic structural block diagram of a packet loss retransmission system 900 according to another embodiment of this application. The structural block diagram shown in FIG. 9 includes: a transmitter terminal 910, a server 920, and a receiver terminal 930. The transmitter terminal 910 includes a feature extraction module 911, a speech encoding module 912, and a data retransmission module 913. The server 920 includes a packet loss detection module 921, an audio routing module 922, a data retransmission module 923, and a perception analysis module 924. The receiver terminal 930 includes a packet loss detection module 931, a speech decoding module 932, an audio mixing module 933, and a playback module 934.

The feature extraction module 911 may acquire an audio signal, and perform feature extraction on the acquired audio signal to obtain an audio feature, and transmit the acquired audio signal to the speech encoding module 912. The speech encoding module 912 may encode the audio signal to obtain a corresponding audio bitstream, and transmit the audio bitstream to the data retransmission module 923. The data retransmission module 923 may package the matched audio bitstream and audio feature into an audio data packet, the audio data packet including a loudness corresponding to the audio data packet, an audio bitstream, and an audio feature corresponding to the audio bitstream, and after a plurality of audio data packets are obtained by packaging, forward the plurality of audio data packets to the server 920 as a data group, so that the packet loss detection module 921 in the server 920 performs packet loss detection on the received data group.

When a packet loss detection result includes an audio data packet in a lost state, the packet loss detection module 921 feeds back the lost state to the data retransmission module 913, so that the data retransmission module 913 performs data retransmission for the lost state. Further, when receiving the retransmitted audio data packet and detecting that there is no audio data packet in the lost state in the data group, the packet loss detection module 921 updates the data group according to the retransmitted audio data packet, and transmits the updated data group to the audio routing module 922. Further, the audio routing module 922 may screen the audio data packets in the data group according to the audio feature corresponding to each data packet in the data group, to obtain a target audio data packet. A maximum energy amplitude corresponding to the target audio data packet is greater than that of other audio data packets in the data group, or a similarity between energy spectrum distribution corresponding to the target audio data packet and preset energy spectrum distribution is greater than that of other audio data packets in the data group. Further, the audio routing module 922 may transmit the target audio data packet to the perception analysis module 924 and the data retransmission module 923, so that the data retransmission module 923 forwards the target audio data packet to the receiver terminal 930. Further, the packet loss detection module 931 in the receiver terminal 930 performs packet loss detection on the target audio data packet. There may be one or more target audio data packets.

When a packet loss detection result includes the target audio data packet in a lost state, the packet loss detection module 931 feeds back the lost state to the data retransmission module 923. Further, when a loudness of the target audio data packet is greater than a preset loudness, the data retransmission module 923 may perform data retransmission for the lost state. There may be one or more target audio data packets in the lost state. Further, when receiving the retransmitted target audio data packet and detecting that there is no target audio data packet in the lost state in all target audio data packets, the packet loss detection module 931 updates all the target audio data packets according to the retransmitted target audio data packet, and transmits all the updated target audio data packets to the speech decoding module 932. Further, the speech decoding module 932 may decode the audio bitstream in each target audio data packet into an audio signal, and transmit the decoded audio signal to the audio mixing module 933, so that the audio mixing module 933 performs audio mixing on the audio signal. Further, the audio mixing module 933 may transmit an audio mixing result to the playback module 934, so that the playback module 934 plays the audio mixing result.

It may be learned that, by implementing the system shown in FIG. 9, the loudness corresponding to the audio data packet can be used as the data retransmission condition, thereby alleviating the problem of long data retransmission time and improving the data transmission efficiency. In addition, the target audio data packet can be retransmitted in a targeted manner. Compared with the related art, retransmitting all the data packets including the target audio data packet and transmitted in the current time can reduce the amount of retransmitted data and reduce the occupation of network resources.

Figure 10:
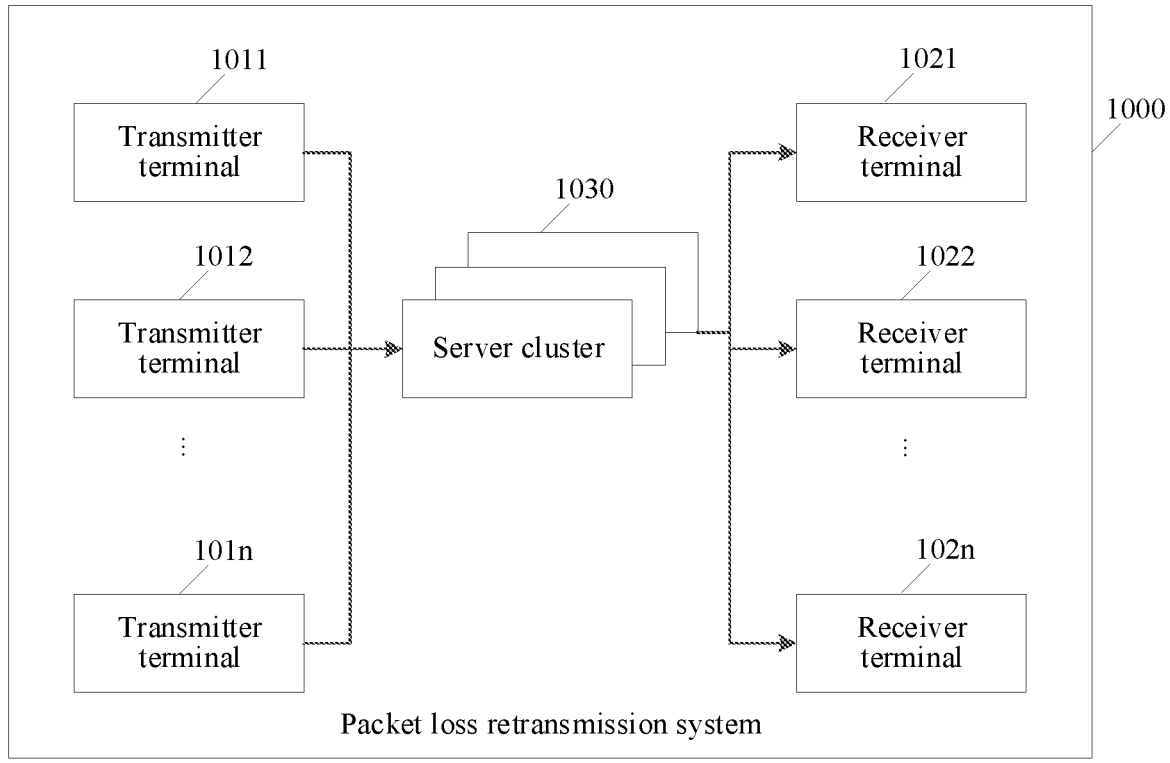
FIG. 10 is a schematic structural block diagram of another packet loss retransmission system according to still another embodiment of this application.

In the embodiments of the example, there may be a plurality of the foregoing transmitter terminals and receiver terminals, and the foregoing server may be a server cluster. FIG. 10 is a schematic structural block diagram of a packet loss retransmission system 1000 according to still another embodiment of this application. As shown in FIG. 10, the system 1000 includes a transmitter terminal 1011, a transmitter terminal 1012, and transmitter terminal 101$n$, a server cluster 1030, and a receiver terminal 1021, a receiver terminal 1022, . . . , and a receiver terminal 102$n$, where n is a positive integer greater than or equal to 3.

Referring to FIG. 10, the server cluster 1030 in this application may receive a data group transmitted from at least one of the transmitter terminal 1011, the transmitter terminal 1012, . . . , or the transmitter terminal 101$n$. Each data group may include one or more audio data packet. If the audio data packet meets a preset condition, the audio data packet may be determined as a target audio data packet by the server cluster 1030 and forwarded to the receiver terminal 1021, the receiver terminal 1022, . . . , and the receiver terminal 102$n$. If a packet loss state that is for representing that a target audio data packet is lost and that is transmitted by any one of the receiver terminal 1021, the receiver terminal 1022, . . . , or the receiver terminal 102$n$ is received, the target audio data packet is retransmitted according to a loudness corresponding to the target audio data packet.

It may be learned that, by implementing the system shown in FIG. 10, the loudness corresponding to the audio data packet can be used as the data retransmission condition, thereby alleviating the problem of long data retransmission time and improving the data transmission efficiency. In addition, the target audio data packet can be retransmitted in a targeted manner. Compared with the related art, retransmitting all the data packets including the target audio data packet and transmitted in the current time can reduce the amount of retransmitted data and reduce the occupation of network resources.

Figure 11:
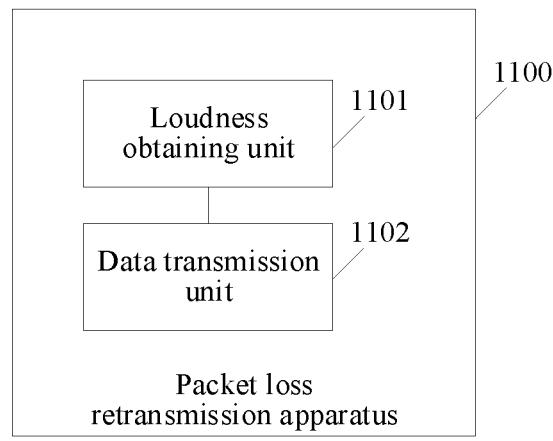
FIG. 11 is a schematic structural block diagram of a packet loss retransmission apparatus according to an embodiment of this application.

In the embodiments of this application, a packet loss retransmission apparatus is further provided. As shown in FIG. 11, the packet loss retransmission apparatus 1100 may include:
- a loudness obtaining unit 1101, configured to obtain a loudness corresponding to a target audio data packet; and
- a data transmission unit 1102, configured to retransmit the target audio data packet according to the loudness corresponding to the target audio data packet when a packet loss state for representing that the target audio data packet is lost is received.

It may be learned that, by implementing the apparatus shown in FIG. 11, the loudness corresponding to the audio data packet can be used as the data retransmission condition, thereby alleviating the problem of long data retransmission time, and improving the data transmission efficiency. In addition, the target audio data packet can be retransmitted in a targeted manner. Compared with the related art, retransmitting all the data packets including the target audio data packet and transmitted in the current time can reduce the amount of retransmitted data and reduce the occupation of network resources.

In an exemplary embodiment of this application, the apparatus further includes a data packet screening unit (not shown in the figure).

The data packet screening unit is configured to screen the target audio data packet whose audio feature meets a preset condition from a plurality of obtained audio data packets before the loudness obtaining unit 1101 obtains the loudness corresponding to the target audio data packet.

It may be learned that, by implementing some embodiments, the received audio data packet can be screened through the audio feature, to reduce the amount of forwarded data, thereby reducing the loss of network resources and improving the data transmission efficiency.

In an exemplary embodiment of this application, the apparatus further includes a packet loss detection unit (not shown in the figure) and a packet loss state feedback unit (not shown in the figure).

The packet loss detection unit is configured to perform packet loss detection on the plurality of received audio data packets before the data packet screening unit screens the target audio data packet whose audio feature meets a preset condition from the plurality of received audio data packets.

The packet loss state feedback unit is configured to feed back, when a packet loss detection result includes a lost state, the lost state to a transmitter terminal, so that the transmitter terminal performs data retransmission for the lost state.

The audio data packet includes a loudness corresponding to the audio data packet, an audio bitstream, and an audio feature corresponding to the audio bitstream. The audio feature corresponding to the audio bitstream includes energy distribution corresponding to the audio bitstream and an energy amplitude corresponding to each frequency in the audio bitstream.

It may be learned that, by implementing some embodiments, the transmitter terminal can be triggered to perform data retransmission when the packet loss state is detected, which can improve integrity of the transmitted data.

In an exemplary embodiment of this application, the apparatus further includes a data packet update unit (not shown in the figure).

The data packet update unit is configured to update the plurality of audio data packets according to the retransmitted data packet after the transmitter terminal performs data retransmission for the lost state, and before the data packet screening unit screens the target audio data packet whose audio feature meets a preset condition from the plurality of obtained audio data packets.

It may be learned that, by implementing some embodiments, integrity of the data transmitted to the receiver terminal can be ensured by updating the data packet.

In an exemplary embodiment of this application, the plurality of received audio data packets are transmitted by the transmitter terminal.

The plurality of audio data packets are obtained by the transmitter terminal packaging the audio bitstream and the audio feature. The audio feature is obtained by the transmitter terminal acquiring an audio signal and performing feature extraction on the audio signal. The audio bitstream is obtained by the transmitter terminal encoding the audio signal.

It may be learned that, by implementing some embodiments, the transmitter terminal can perform feature extraction on the audio signal, which can help the server to select a channel signal according to the feature extraction result, thereby ensuring the real-time performance of the audio output in the multi-person conference, and ensuring the audio output effect.

In an exemplary embodiment of this application, the preset condition includes a preset energy amplitude and/or a preset signal-to-noise ratio. The data packet screening unit screening the target audio data packet whose audio feature meets a preset condition from the plurality of obtained audio data packets includes:
- determining the audio data packet to which the audio bitstream corresponding to the audio feature belongs as the target audio data packet in response to detecting that there is at least one energy amplitude greater than the preset energy amplitude in the audio feature; and/or,
- determining the audio data packet to which the audio bitstream corresponding to the audio feature belongs as the target audio data packet in response to detecting that there is at least one signal-to-noise ratio greater than the preset signal-to-noise ratio in the audio feature.

It may be learned that, by implementing some embodiments, the audio data packets can be screened according to the energy amplitude or the signal-to-noise ratio, to reduce the audio data packets that need to be transmitted and improve the data transmission efficiency.

In an exemplary embodiment of this application, the loudness obtaining unit 1101 is configured to:
- frame an audio bitstream in the target audio data packet according to a preset duration, to obtain a plurality of audio frames;
- process the plurality of audio frames respectively through a preset window functions, to obtain a plurality of reference frames;
- calculate a power spectrum respectively corresponding to the plurality of reference frames; and
- calculate the loudness corresponding to the target audio data packet according to the power spectrum.

The preset window function is a Hanning window function, a Hamming window function, a Blackman window function, a Keiser window function, a triangular window function, or a rectangular window function.

It may be learned that, by implementing some embodiments, an audio loudness of the target audio data packet can be obtained through calculation. The audio loudness can be used as the data retransmission condition. When the audio loudness is low, the server may not retransmit the lost target audio data packet, to reduce the occupation of network resources.

In an exemplary embodiment of this application, the loudness obtaining unit 1101 is specifically configured to:
- calculate a frequency loudness of each frequency in the power spectrum according to an energy amplitude of each frequency in the power spectrum;
- calculate a loudness weight of each frequency in the power spectrum according to the frequency loudness;
- calculate a weighted sum between the energy amplitude of each frequency in the power spectrum and the loudness weight of each frequency in the power spectrum as a loudness value of the reference frame corresponding to the power spectrum; and
- determine a sum of the loudness values corresponding to the plurality of reference frames as the loudness corresponding to the target audio data packet.

It may be learned that, by implementing some embodiments, the loudness corresponding to the target audio data packet can be determined as the data retransmission condition according to the loudness corresponding to each frequency, thereby improving the data retransmission efficiency of the server.

In an exemplary embodiment of this application, the data transmission unit 1102 is configured to:
- retransmit the target audio data packet to the receiver terminal when the loudness corresponding to the target audio data packet is greater than a preset loudness, so that the receiver terminal decodes and outputs the target audio data packet after retransmission and the target audio data packet before retransmission.

It may be learned that, by implementing some embodiments, the audio data packets can be screened according to the loudness, which reduces the occupation of network resources by the sounds with relatively weak perception of human ears, thereby improving the data transmission efficiency. In addition, in this application, the lost data packet can be retransmitted. Therefore, this application can resolve the problem of low transmission efficiency caused by retransmitting all data of the entire data group for each retransmission in the related art.

In an exemplary embodiment of this application, the method for the receiver terminal to decode and output the target audio data packet after retransmission and the target audio data packet before retransmission is specifically:
- decoding, by the receiver terminal, the target audio data packet after retransmission and the target audio data packet before retransmission, to obtain a plurality of to-be-outputted audio signals; and
- performing, by the receiver terminal, audio mixing on the plurality of to-be-outputted audio signals, to obtain and play a mixed audio signal.

It may be learned that, by implementing some embodiments, after receiving a plurality of complete audio data packets, the receiver terminal can perform audio mixing on the plurality of complete audio data packets for output. The output result retains important audio content in the conference and discards audio content with weak perception of human ears, which can improve message forwarding efficiency of the multi-person conference, and ensure the real-time performance of the outputted audio signal, thereby improving the user experience.

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified.

Because the functional modules of the packet loss retransmission apparatus in the exemplary embodiment of this application correspond to the steps in the exemplary embodiment of the foregoing packet loss retransmission method, for details not disclosed in the apparatus embodiment of this application, reference may be made to the embodiments of the packet loss retransmission method of this application.

In another aspect, this application further provides a computer-readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

The computer-readable medium of the embodiments of this application may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code contained in the computer readable medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

After considering the specification and practicing the present disclosure, a person skilled in the art will easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It should be understood that this application is not limited to the precise structures described above and shown in the accompanying drawings, and various modifications and changes can be made without departing from the scope of this application. The scope of this application is limited only by the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs a packet loss retransmission method. In practical application, the foregoing functions may be allocated to and completed by different functional modules according to requirements, that is, an inner structure of a device is divided into different functional modules to implement all or a part of the functions described above.

What is claimed is:

1. A packet loss retransmission method, performed by an electronic device, the method comprising:
   performing packet loss detection on a plurality of audio data packets;
   providing feedback to a transmitter terminal in accordance with a determination that a packet loss detection result comprises a lost state, the feedback including indication of the lost state;
   after providing the feedback, screening a target audio data packet for an audio feature that meets a preset condition;
   after screening the target audio data packet, obtaining a loudness corresponding to the target audio data packet; and
   in response to receiving a packet loss state indicating that the target audio data packet is lost:
      in accordance with a determination that the loudness corresponding to the target audio data packet meets a first phon threshold, retransmitting the target audio data packet, wherein the first phon threshold corresponds to perceptibility by human ears; and
      in accordance with a determination that the loudness corresponding to the target audio data packet does not meet the first phon threshold, forgoing retransmitting the target audio data packet.

2. The method according to claim 1, wherein retransmitting the target audio data packet comprises:
   retransmitting the target audio data packet to a receiver terminal so that the receiver terminal decodes and outputs the target audio data packet received after retransmission and the target audio data packet received before retransmission.

3. The method according to claim 1, wherein obtaining the loudness corresponding to the target audio data packet comprises:
   framing an audio bitstream in the target audio data packet according to a preset duration to obtain a plurality of audio frames;
   processing each of the plurality of audio frames through a preset window function to obtain a plurality of reference frames;
   calculating a power spectrum for each of the plurality of reference frames; and
   calculating the loudness corresponding to the target audio data packet according to the power spectrum.

4. The method according to claim 3, wherein the preset window function is a Hanning window function, a Hamming window function, a Blackman window function, a Kaiser window function, a triangular window function, or a rectangular window function.

5. The method according to claim 3, wherein calculating the loudness corresponding to the target audio data packet according to the power spectrum comprises:
   calculating a frequency loudness at each frequency in the power spectrum according to an energy amplitude of each frequency in the power spectrum;
   calculating a loudness weight of each frequency in the power spectrum according to the frequency loudness;
   calculating a weighted sum between the energy amplitude of each frequency in the power spectrum and the loudness weight of each frequency in the power spectrum as a loudness value of the reference frame; and determining a sum of the loudness values corresponding to the plurality of reference frames as the loudness corresponding to the target audio data packet.

6. The method according to claim 2, wherein decoding and outputting, by the receiver terminal, the target audio data packet received after retransmission and the target audio data packet received before retransmission include:
  decoding, by the receiver terminal, the target audio data packet received after retransmission and the target audio data packet received before retransmission to obtain a plurality of to-be-outputted audio signals; and
  performing, by the receiver terminal, audio mixing on the plurality of to-be-outputted audio signals to obtain and play a mixed audio signal.

7. The method according to claim 1, further comprising:
  updating the plurality of audio data packets according to a retransmitted data packet.

8. The method according to claim 1, wherein the audio data packet comprises the loudness of the audio data packet, an audio bitstream, and an audio feature of the audio bitstream, and wherein the audio feature of the audio bitstream comprises an energy distribution of the audio bitstream and an energy amplitude of each frequency in the audio bitstream.

9. The method according to claim 1, wherein obtaining the plurality of audio data packets comprises receiving the plurality of audio data packets transmitted by the transmitter terminal.

10. The method according to claim 8, wherein the preset condition comprises a preset energy amplitude and/or a preset signal-to-noise ratio, and screening the target audio data packet for the audio feature that meets the preset condition from a plurality of obtained audio data packets comprises:
  in accordance with a determination that there is at least one energy amplitude greater than the preset energy amplitude in the audio feature and/or in accordance with a determination that there is at least one signal-to-noise ratio greater than the preset signal-to-noise ratio in the audio feature:
    setting the audio data packet associated with the audio bitstream corresponding to the audio feature belongs as the target audio data packet.

11. A system, comprising:
  one or more processors; and
  memory storing one or more programs, the one or more programs comprising instructions that, when executed by the one or more processors, cause the one or more processors to perform operations comprising:
    performing packet loss detection on a plurality of audio data packets;
    providing feedback to a transmitter terminal in accordance with a determination that a packet loss detection result comprises a lost state, the feedback including indication of the lost state;
    after providing the feedback, screening a target audio data packet for an audio feature that meets a preset condition;
    after screening the target audio data packet, obtaining a loudness corresponding to the target audio data packet; and
    in response to receiving a packet loss state indicating that the target audio data packet is lost:
      in accordance with a determination that the loudness corresponding to the target audio data packet meets a first phon threshold, retransmitting the target audio data packet, wherein the first phon threshold corresponds to perceptibility by human ears; and
      in accordance with a determination that the loudness corresponding to the target audio data packet does not meet the first phon threshold, forgoing retransmitting the target audio data packet.

12. The system according to claim 11, wherein retransmitting the target audio data packet comprises:
  retransmitting the target audio data packet to a receiver terminal so that the receiver terminal decodes and outputs the target audio data packet received after retransmission and the target audio data packet received before retransmission.

13. The system according to claim 11, wherein obtaining the loudness corresponding to the target audio data packet comprises:
  framing an audio bitstream in the target audio data packet according to a preset duration to obtain a plurality of audio frames;
  processing each of the plurality of audio frames through a preset window function to obtain a plurality of respective reference frames;
  calculating a power spectrum for each of the plurality of reference frames; and
  calculating the loudness corresponding to the target audio data packet according to the power spectrum.

14. The system according to claim 13, wherein the preset window function is a Hanning window function, a Hamming window function, a Blackman window function, a Kaiser window function, a triangular window function, or a rectangular window function.

15. The system according to claim 13, wherein calculating the loudness corresponding to the target audio data packet according to the power spectrum comprises:
  calculating a frequency loudness at each frequency in the power spectrum according to an energy amplitude of each frequency in the power spectrum;
  calculating a loudness weight of each frequency in the power spectrum according to the frequency loudness;
  calculating a weighted sum between the energy amplitude of each frequency in the power spectrum and the loudness weight of each frequency in the power spectrum as a loudness value of the reference frame; and
  determining a sum of the loudness values corresponding to the plurality of reference frames as the loudness corresponding to the target audio data packet.

16. A non-transitory computer-readable storage medium, storing a computer program, the computer program, when executed by one or more processors of an electronic device, causing the one or more processors to perform operations comprising:
  performing packet loss detection on a plurality of audio data packets;
  providing feedback to a transmitter terminal in accordance with a determination that a packet loss detection result comprises a lost state, the feedback including indication of the lost state;
  after providing the feedback, screening a target audio data packet for an audio feature that meets a preset condition;
  after screening the target audio data packet, obtaining a loudness corresponding to the target audio data packet; and
  in response to receiving a packet loss state indicating that the target audio data packet is lost:

in accordance with a determination that the loudness corresponding to the target audio data packet meets a first phon threshold, retransmitting the target audio data packet, wherein the first phon threshold corresponds to perceptibility by human ears; and in accordance with a determination that the loudness corresponding to the target audio data packet does not meet the first phon threshold, forgoing retransmitting the target audio data packet.

17. The non-transitory computer-readable storage medium according to claim 16, wherein retransmitting the target audio data packet comprises:

retransmitting the target audio data packet to a receiver terminal so that the receiver terminal decodes and outputs the target audio data packet received after retransmission and the target audio data packet received before retransmission.

18. The non-transitory computer-readable storage medium according to claim 17, wherein decoding and outputting the target audio data packet received after retransmission and the target audio data packet received before retransmission include:

decoding the target audio data packet received after retransmission and the target audio data packet received before retransmission to obtain a plurality of to-be-outputted audio signals; and performing audio mixing on the plurality of to-be-outputted audio signals to obtain and play a mixed audio signal.

19. The non-transitory computer-readable storage medium according to claim 16, wherein obtaining the loudness corresponding to the target audio data packet comprises:

framing an audio bitstream in the target audio data packet according to a preset duration to obtain a plurality of audio frames;

processing each of the plurality of audio frames through a preset window function to obtain a plurality of reference frames;

calculating a power spectrum for each of the plurality of reference frames; and calculating the loudness corresponding to the target audio data packet according to the power spectrum.

20. The non-transitory computer-readable storage medium according to claim 19, wherein the preset window function is a Hanning window function, a Hamming window function, a Blackman window function, a Kaiser window function, a triangular window function, or a rectangular window function.

* * * * *